United States Patent
Arnott et al.

(10) Patent No.: US 11,184,101 B2
(45) Date of Patent: Nov. 23, 2021

(54) SCRAMBLING INITIALISATION IN A COMMUNICATIONS SYSTEM

(71) Applicant: NEC CORPORATION, Tokyo (JP)

(72) Inventors: Robert Arnott, London (GB); Yassin Aden Awad, Uxbridge (GB); Caroline Liang, London (GB)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 15/773,310

(22) PCT Filed: Nov. 1, 2016

(86) PCT No.: PCT/JP2016/004786
§ 371 (c)(1),
(2) Date: May 3, 2018

(87) PCT Pub. No.: WO2017/077705
PCT Pub. Date: May 11, 2017

(65) Prior Publication Data
US 2018/0323897 A1 Nov. 8, 2018

(30) Foreign Application Priority Data

Nov. 6, 2015 (GB) ..................... 1519656

(51) Int. Cl.
*H04W 4/70* (2018.01)
*H04W 8/26* (2009.01)
(Continued)

(52) U.S. Cl.
CPC .......... *H04J 13/10* (2013.01); *H04J 13/0022* (2013.01); *H04J 13/0025* (2013.01); *H04W 4/70* (2018.02); *H04W 8/26* (2013.01); *H04W 72/0466* (2013.01)

(58) Field of Classification Search
None
See application file for complete search history.

(56) References Cited

U.S. PATENT DOCUMENTS 8,588,150 B2 11/2013 Luo et al.
9,386,476 B2 * 7/2016 Han ..................... H04W 64/00
(Continued)

FOREIGN PATENT DOCUMENTS

CN 102549965 A 7/2012
CN 103621030 A 3/2014
(Continued)

OTHER PUBLICATIONS

Communication dated Oct. 8, 2019, issued by the Japan Patent Office in counterpart application No. 2018-541735.
(Continued)

*Primary Examiner* — Robert M Morlan
(74) *Attorney, Agent, or Firm* — Sughrue Mion, PLLC

(57) ABSTRACT

Scrambling code is initialized based on a parameter, $n'_{RNTI}$, that changes from a given block of sub-frames to a subsequent block of sub-frames wherein the parameter is derived using one of the following formulas:

$$n'_{RNTI} = (n_{RNTI} + SFN) \bmod 2^{16}$$

$$n'_{RNTI} = (n_{RNTI} + k) \bmod 2^{16}$$

where $n_{RNTI}$ is a temporary identifier associated with a mobile device connected to said cell and for which said scrambling code is applicable; and SFN is a system frame number associated with said at least one of said sequence of sub-frames; and k is a sub-frame counter.

15 Claims, 6 Drawing Sheets

(51) Int. Cl.
*H04W 72/04* (2009.01)
*H04J 13/10* (2011.01)
*H04J 13/00* (2011.01)

(56) References Cited

U.S. PATENT DOCUMENTS

| | | | |
|---|---|---|---|
| 9,876,615 B2* | 1/2018 | You | H04L 27/2602 |
| 10,014,999 B2* | 7/2018 | Wang | H04L 5/0094 |
| 2010/0260154 A1 | 10/2010 | Frank et al. | |
| 2010/0322178 A1 | 12/2010 | Li et al. | |
| 2013/0039284 A1 | 2/2013 | Marinier et al. | |
| 2015/0078348 A1 | 3/2015 | Han et al. | |
| 2016/0337103 A1 | 11/2016 | Kim et al. | |
| 2017/0289936 A1* | 10/2017 | Chae | H04W 56/001 |
| 2019/0150156 A1* | 5/2019 | Ahmadi | H04B 7/0632 370/329 |

FOREIGN PATENT DOCUMENTS

| | | |
|---|---|---|
| CN | 104205691 A | 12/2014 |
| CN | 104412554 A | 3/2015 |
| JP | 2013-192268 A | 9/2013 |
| JP | 2014-508471 A | 4/2014 |
| JP | 2015-164341 A | 9/2015 |
| WO | 2015/042004 A1 | 3/2015 |
| WO | 2015/119478 A1 | 8/2015 |

OTHER PUBLICATIONS

3rd Generation Partnership Project; Technical Specification Group Radio Access Network; Evolved Universal Terrestrial Radio Access (E-UTRA); Physical channels and modulation (Release 12), 3GPP TS 36.211, V12.7.0 (Sep. 2015), Sep. 25, 2015, 136 pages.

Communication dated Dec. 18, 2019, from the China National Intellectual Property Administration in Application No. 201680064757.4.

3GPP TS 22.368 V13.1.0, 3rd Generation Partnership Project; Technical Specification Group Services and System Aspects; Service requirements for Machine-Type Communications (MTC); Stage 1 (Release 13), Dec. 2014, pp. 1-26.

"Simulation Assumptions for Reference Cases for MTC", Nokia Networks, 3GPP TSG-RAN WG1 Meeting #78bis, R1-144513, Ljubljana, Slovenia, Oct. 6-10, 2014, 3 pages.

"Extending the Scrambling sequence for DL/UL transmissions", NEC, 3GPP TSG RAN WG1 Meeting #83, R1-156683, Anaheim, USA, Nov. 15-22, 2015, pp. 1-3.

3GPP TR 36.888 V12.0.0, 3rd Generation Partnership Project; Technical Specification Group Radio Access Network; Study on provision of low-cost Machine-Type Communications (MTC) User Equipments (UEs) based on LTE (Release 12), Jun. 2013, pp. 1-55.

"Revised WI: Further LTE Physical Layer Enhancements for MTC", Ericsson, 3GPP TSG RAN Meeting #67, RP-150492, Shanghai, China, Mar. 9-12, 2015, 8 pages.

"Discussion on open issues in MTC PDSCH", Spreadtrum Communications, 3GPP TSG-RAN WG1 Meeting #82, R1-154460, Beijing, People's Republic of China, Aug. 24-28, 2015, 3 pages.

"Discussion on open issues in MTC PDSCH", Spreadtrum Communications, 3GPP TSG-RAN WG1 Meeting #82bis, R1-155607, Malmo, Sweden, Oct. 5-9, 2015, pp. 1-4.

"Coverage enhancement of PBCH for low cost MTC", Intel Corporation, 3GPP TSG RAN WG1 Meeting #75, R1-135103, San Francisco, USA, Nov. 11-15, 2013, pp. 1-7.

International Search Report for PCT/JP2016/004786 dated Apr. 4, 2017 [PCT/ISA/210].

Written Opinion for PCT/JP2016/004786 dated Apr. 4, 2017 [PCT/ISA/237].

Communication dated Sep. 23, 2020, from the State Intellectual Property office of the P.R.C in application No. 201680064757.4.

Communication dated May 28, 2020, from the Intellectual Property of India in application No. 201817014880.

* cited by examiner

[Fig. 1]
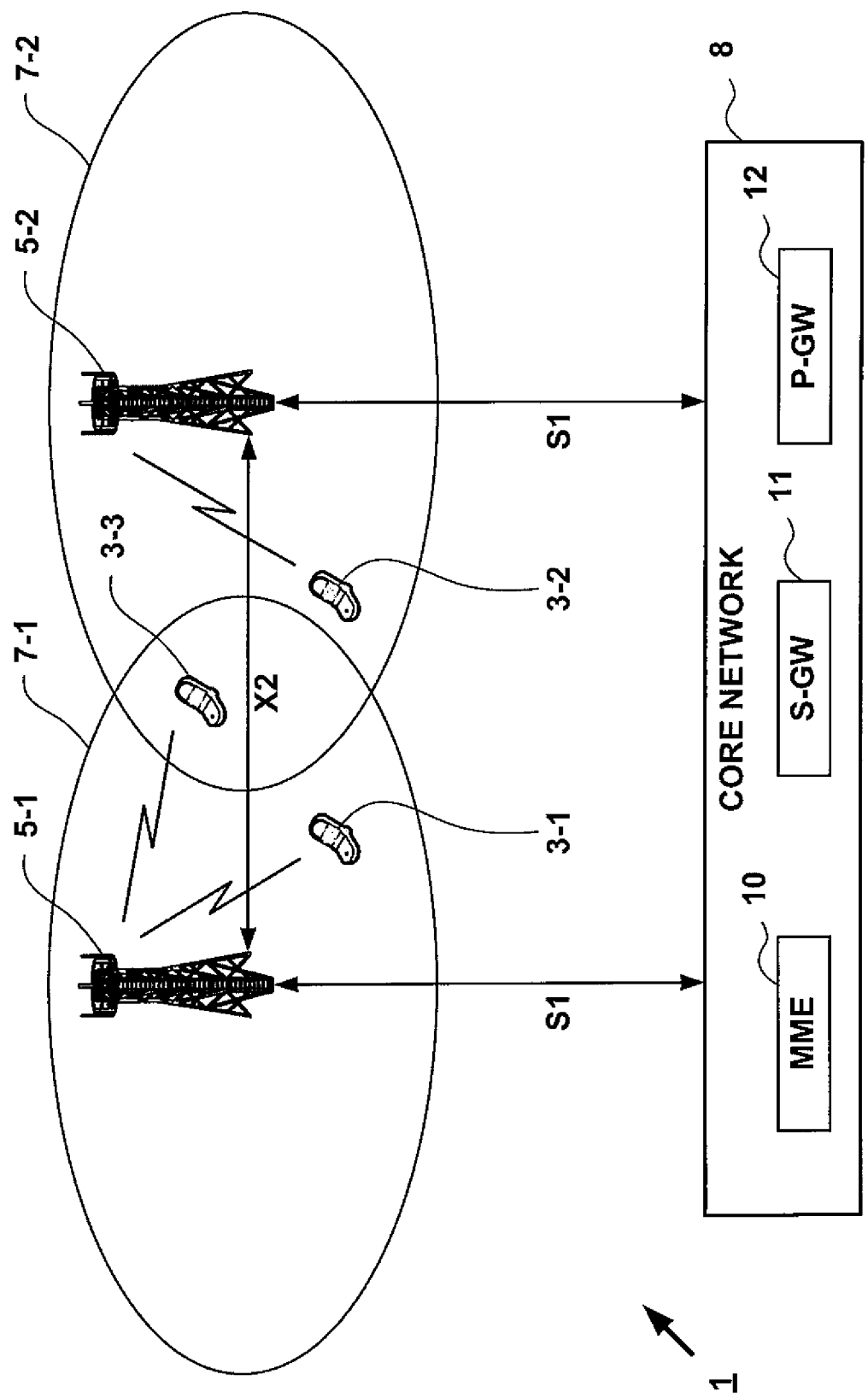

[Fig. 2a]
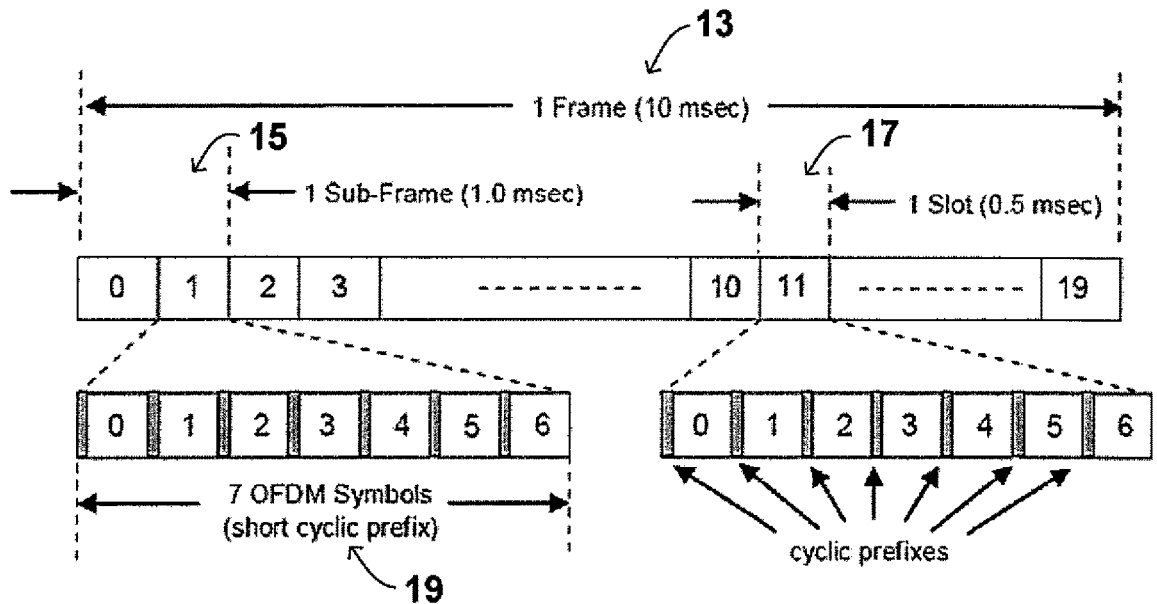
[Fig. 2b]
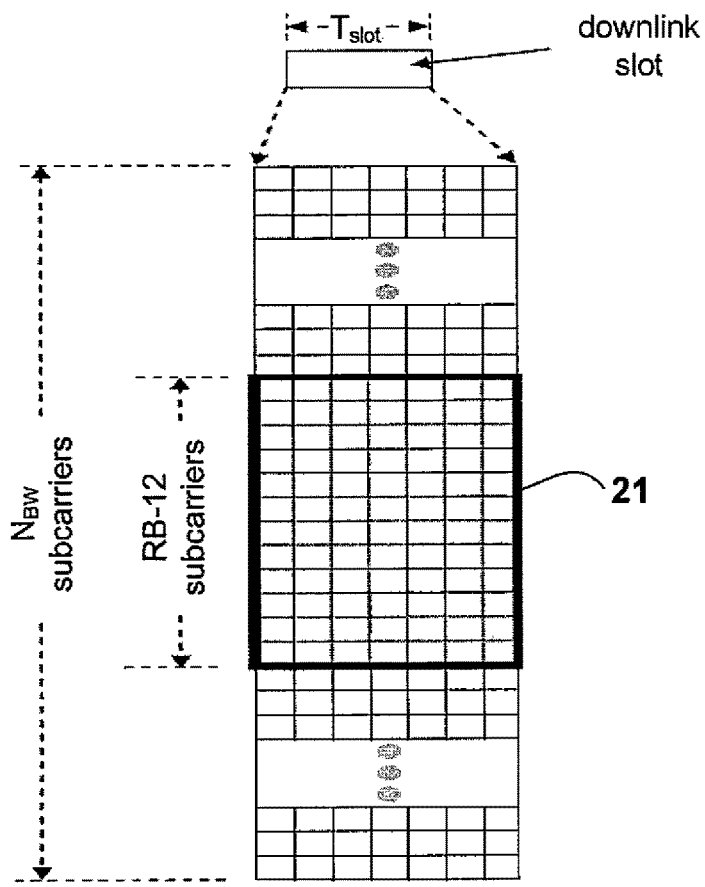

[Fig. 3]
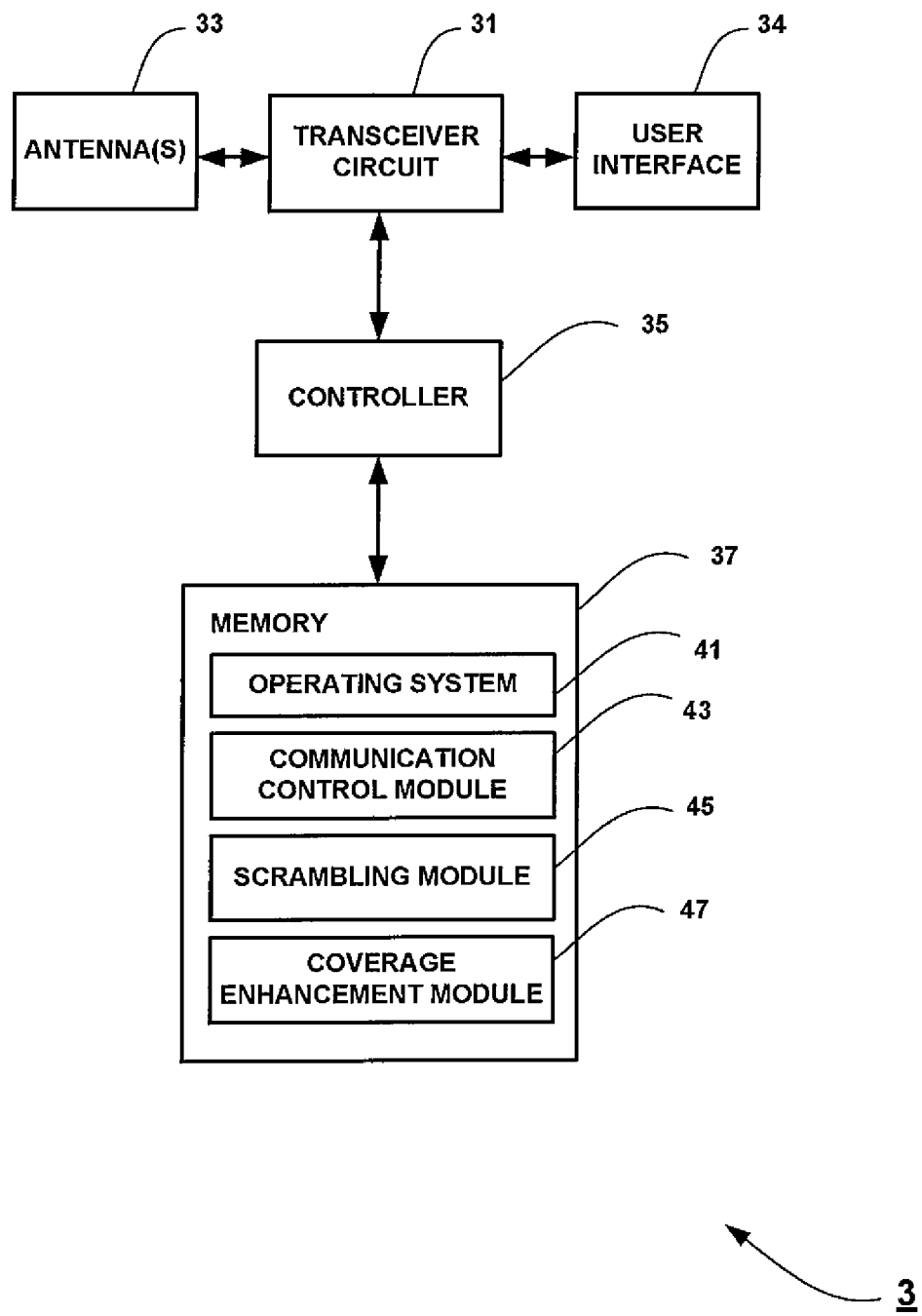

[Fig. 4]
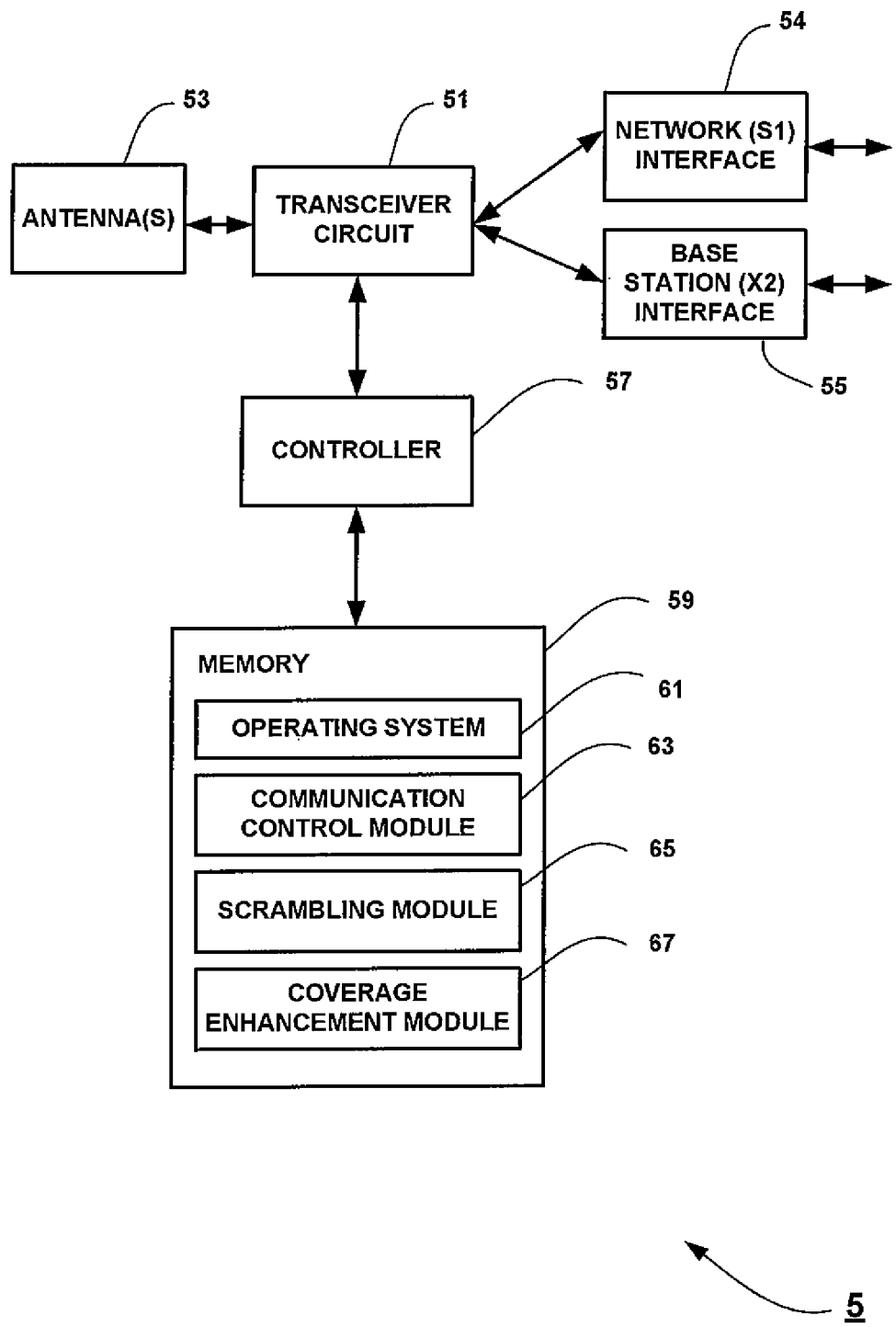

[Fig. 5]
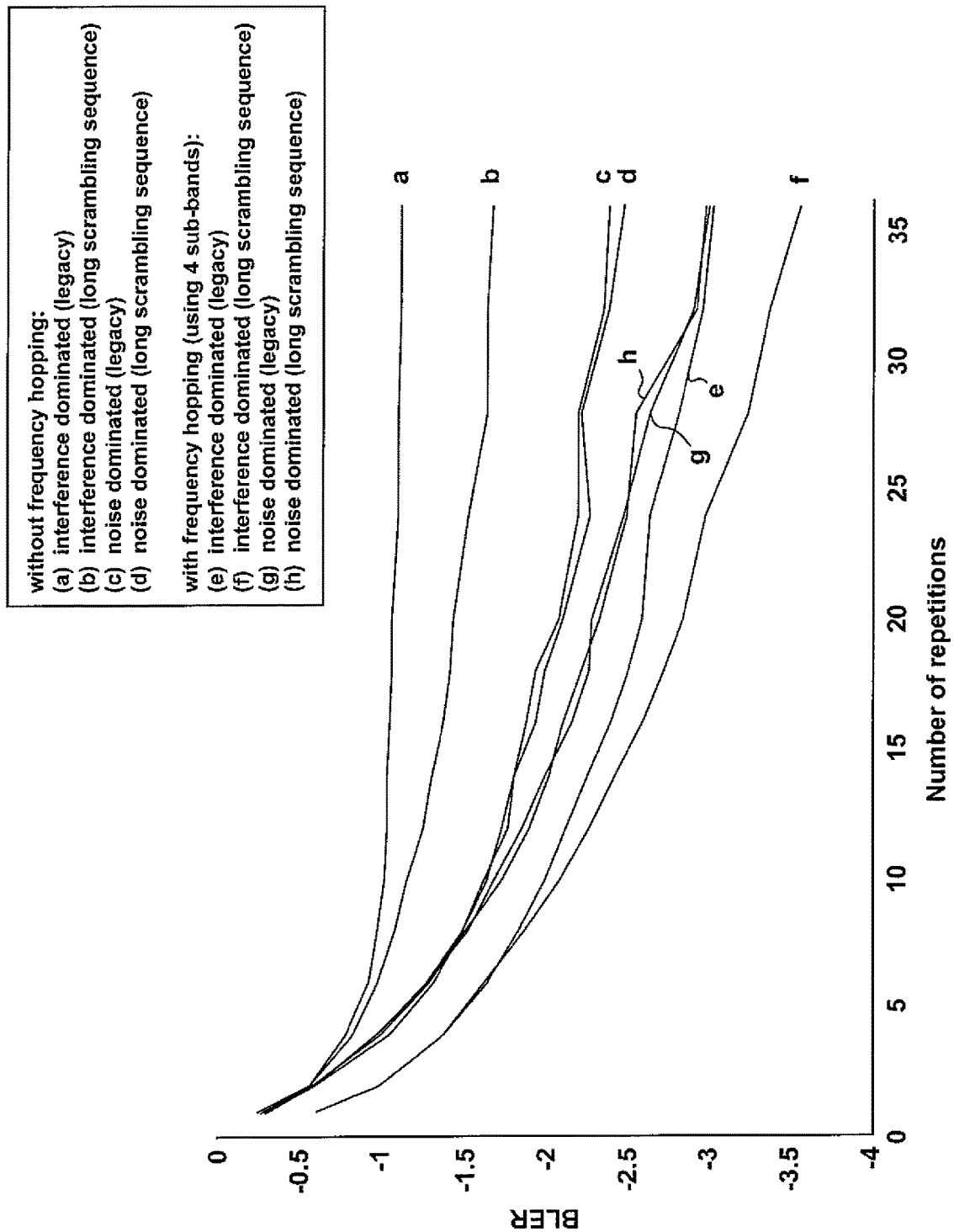

[Fig. 6]
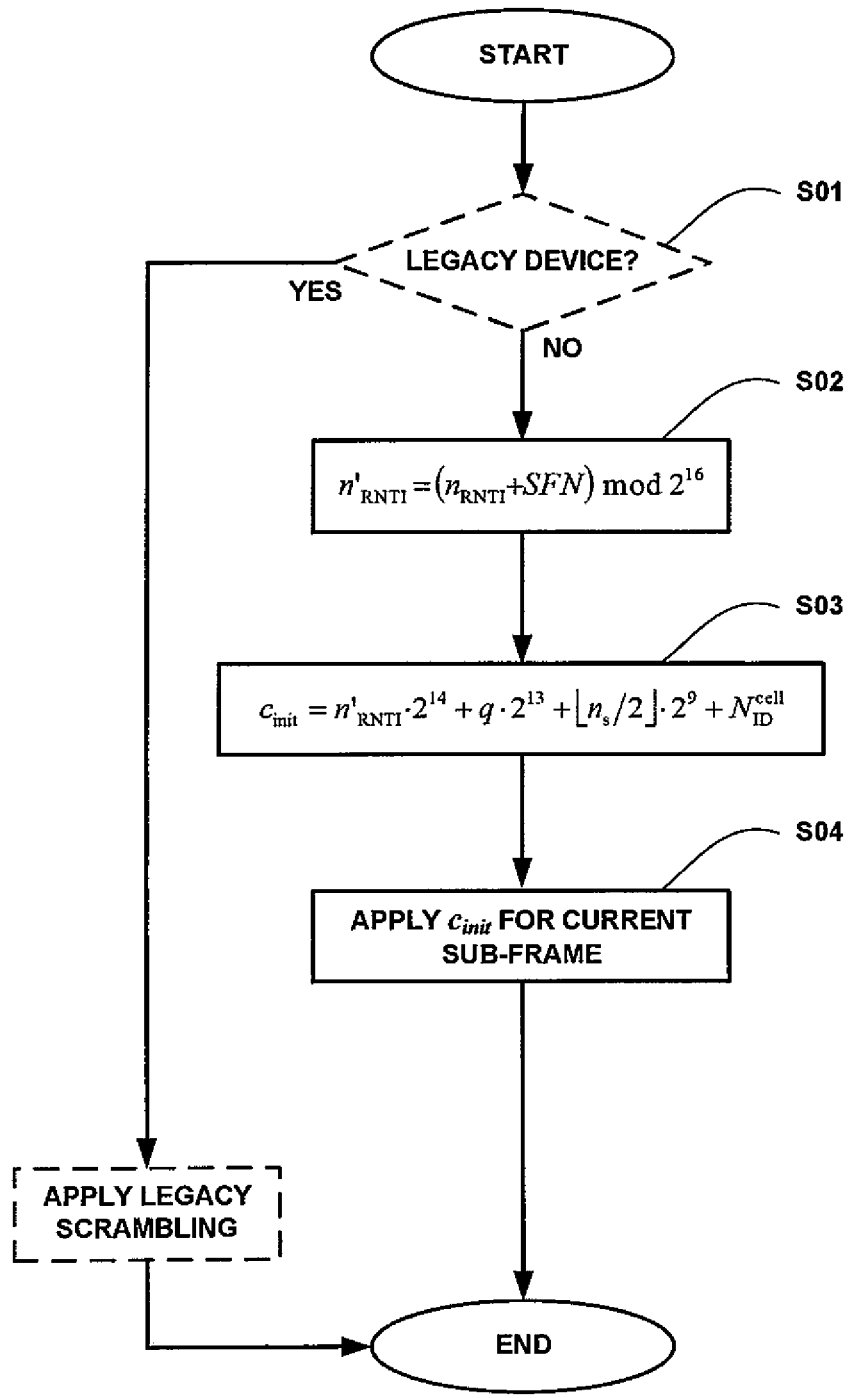

SCRAMBLING INITIALISATION IN A COMMUNICATIONS SYSTEM

CROSS REFERENCE TO RELATED APPLICATIONS

This application is a National Stage of International Application No. PCT/JP2016/004786, filed on Nov. 1, 2016, which claims priority from British Patent Application No. 1519656.1, filed on Nov. 6, 2015, the disclosure of which is incorporated herein in its entirety by reference.

TECHNICAL FIELD

The present invention relates to mobile communication devices and networks, particularly but not exclusively those operating according to the 3rd Generation Partnership Project (3GPP) standards or equivalents or derivatives thereof. The invention has particular although not exclusive relevance to addressing interference in the Long Term Evolution (LTE) of the Evolved Universal Terrestrial Radio Access Network (E-UTRAN).

BACKGROUND ART

In a mobile (cellular) communications network, (user) communication devices (also known as user equipment (UE), for example mobile telephones) communicate with remote servers or with other communication devices via base stations. In their communication with each other, communication devices and base stations use licensed radio frequencies, which are typically divided into frequency bands and/or time blocks.

Traditionally, a given geographical area is divided into cells. Each cell of a network (thus each communication device within a cell) is served by a base station. The operation of the base stations is controlled by a base station controller, which might be implemented as part of the base stations or as a separate entity. The base stations are capable of dynamically adjusting their transmission power and/or direction to ensure optimum radio channel quality to the served communication devices (such as mobile telephones and other user equipment).

Recent developments in telecommunications have seen a large increase in the use of machine-type communications (MTC) devices which are networked devices arranged to communicate and perform actions without human assistance. Examples of such devices include smart meters, which can be configured to perform measurements and relay these measurements to other devices via a telecommunication network. Machine-type communication devices are also known as machine-to-machine (M2M) communication devices.

MTC devices connect to the network whenever they have data to send to or receive from a remote 'machine' (e.g. a server) or user. MTC devices use communication protocols and standards that are optimised for mobile telephones or similar user equipment. However, MTC devices, once deployed, typically operate without requiring human supervision or interaction, and follow software instructions stored in an internal memory. MTC devices might also remain stationary and/or inactive for a long period of time. The specific network requirements to support MTC devices have been dealt with in the 3GPP technical specification (TS) 22.368 version 13.1.0, the contents of which are incorporated herein by reference.

For the Release 13 (Rel-13) version of the standards relating to MTC devices, support for a reduced bandwidth of 1.4 MHz in downlink and uplink is envisaged. Thus, some MTC devices will support only a limited bandwidth (typically 1.4 MHz) compared to the total LTE bandwidth and/or they may have fewer/simplified components. This allows such 'reduced bandwidth' MTC devices to be made more economically compared to MTC devices supporting a larger bandwidth and/or having more complicated components.

The lack of network coverage (e.g. when deployed indoors), in combination with the often limited functionality of MTC devices, can result in such MTC devices having a low data rate and therefore there is a risk of some transmissions not being received by an MTC device (or not received correctly). In order to mitigate this risk, it has been proposed to increase the coverage of certain LTE transmissions (channels) to support such MTC devices (e.g. corresponding to 20 dB for frequency division duplex (FDD) transmissions).

One approach proposed for the enhancement of coverage for MTC devices is the repetition of the same information across multiple (e.g. two, three, four, or more) sub-frames. In other words, for coverage enhanced MTC devices, the base station duplicates the transmitted information in the time domain (the base station re-transmits the same information in one or more sub-frames subsequent to the sub-frame in which that information is first sent). Such a coverage enhanced MTC device can be configured to combine the multiple copies of the (same) information received in the multiple sub-frames, and after combining the received information, the coverage enhanced MTC device is more likely to be able to decode transmitted data successfully than based on a single copy of the information.

In LTE systems, a bit-level scrambling code/sequence is currently applied for all downlink (DL) and uplink (UL) transmissions between E-UTRAN base stations and connected user equipment (including MTC devices). Specifically, scrambling is applied for transmissions over the Physical Broadcast Channel (PBCH), the Physical Downlink Shared Channel (PDSCH), the Physical Downlink Control Channel (PDCCH), the Physical Control Format Indicator Channel (PCFICH), the Physical Hybrid ARQ Indicator Channel (PHICH), and the Physical Uplink Shared Channel (PUSCH).

The scrambling sequence currently specified by 3GPP is pseudo-random (created using a length-31 Gold sequence generator), with a periodicity of ten subframes (i.e. one radio frame), after which it is repeated indefinitely.

The purpose of applying a scrambling sequence is to randomise interference that arises between transmissions in neighbouring cells (e.g. adjacent or overlapping cells), and thereby mitigate the adverse effects of such 'inter-cell' interference. This is possible, because when a receiving device (e.g. a UE/MTC device in case of DL transmissions) descrambles a received bitstream with a known cell-specific scrambling sequence, interference from other cells will be descrambled incorrectly and therefore only appear as uncorrelated noise (rather than actual user data).

For PUSCH and PDSCH, the scrambling sequence is initialised, in each sub-frame, using the following formula (at both the transmitter and the receiver):

$$c_{init} = n_{RNTI} \cdot 2^{14} + q \cdot 2^{13} + \lfloor n_s/2 \rfloor \cdot 2^9 + N_{ID}^{cell} \quad \text{[Math. 1]}$$

where $c_{init}$ is an initial scrambling code for a sub-frame; $n_{RNTI}$ is a temporary identifier associated with a communication device connected to a cell (operated by a base station); q is a codeword index; $n_s$ is a slot number:

$$N_{ID}^{cell} \quad \text{[Math. 2]}$$

is a unique identifier of that particular cell (a physical layer identity); and $$\lfloor x \rfloor \qquad \text{[Math. 3]}$$

is a flooring function (i.e. the largest integer not greater than 'x').

The resulting scrambling sequence is referred to as the 'legacy scrambling sequence' or the 'Rel-8 scrambling sequence'.

However, the inventors have realised that in some cases the long repetition of information (over more than one radio frame) for MTC-specific coverage enhancement may have a number of disadvantages when using such a legacy scrambling sequence. For example, if the source of the inter-cell interference also uses a similar long repetition (coverage enhancement), then the interfering transmission may combine coherently with the affected transmission (over the course of multiple radio frames) and consequently any signal-to-interference-plus-noise ratio (SINR) gain of repetition combining may be reduced.

This may result in a sub-optimal operation of the system (e.g. it may increase the need for re-transmissions, including repetitions), especially for MTC devices which are typically equipped with less sophisticated transceiver circuitry than conventional LTE user equipment (and hence such MTC devices may be more sensitive to inter-cell interference).

SUMMARY OF INVENTION

Technical Problem

Accordingly, preferred exemplary embodiments of the present invention aim to provide methods and apparatus which overcome or at least partially alleviate the above issues.

Solution to Problem

The invention provides communication apparatus for a cellular communication system comprising a plurality of cells, the communication apparatus comprising: means for communicating signals in a cell in a sequence of radio frames; and means for scrambling said signals communicated in said cell using a scrambling code; wherein said scrambling code is derived based on a parameter that changes from a given block of sub-frames to a subsequent block of sub-frames.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described, by way of example, with reference to the accompanying drawings in which:

BRIEF DESCRIPTION OF DRAWINGS

FIG. 1 schematically illustrates a mobile telecommunication system of a type to which the invention is applicable;

FIG. 2a illustrates a generic frame structure defined for use in the LTE communication network;

FIG. 2b illustrates the way in which a slot illustrated in FIG. 2a is formed of a number of time-frequency resources;

FIG. 3 shows a simplified block diagram of the main components of the communication device shown in FIG. 1;

FIG. 4 shows a simplified block diagram of the main components of a base station shown in FIG. 1;

FIG. 5 is a comparison of simulation results for various scrambling techniques that may be used in the system shown in FIG. 1; and FIG. 6 is an exemplary flowchart showing the initiation of a scrambling sequence in accordance with the present invention.

DESCRIPTION OF EMBODIMENTS

<Overview>

FIG. 1 schematically illustrates a mobile (cellular) telecommunication system 1 in which a user of any of a plurality of communication devices 3 (such as mobile telephones, MTC devices, and/or the like) can communicate with each other and/or with remote servers via one or more of a plurality of base stations 5. Each base station 5 operates one or more associated cell 7. Specifically, in the system 1 shown in FIG. 1, the first base station 5-1 operates a first cell 7-1 in which communication devices 3-1 and 3-3 are located (and served by the first base station 5-1) and the second base station 5-2 operates a second cell 7-2 in which communication devices 3-2 and 3-3 are located (albeit only communication device 3-2 is currently being served via the second cell 7-2). In the system illustrated in FIG. 1, each base station 5 shown is an Evolved Universal Terrestrial Radio Access Network (E-UTRAN) base station, which may also be referred to as an 'eNodeB' (or simply 'eNB') according to the commonly accepted 3GPP terminology.

The base stations 5 are connected to each other via a so-called X2 interface, and to a core network 8 via an S1 interface. In LTE, such a core network 8 is referred to as an Enhanced Packet Core (EPC) network. The base stations 5 may be connected to each other and to the core network either directly or via a suitable gateway, such as a serving gateway, a small cell gateway, an X2 gateway, and/or the like. The core network 8 includes, amongst others, a mobility management entity (MME) 10, a serving gateway (S-GW) 11, and a packet data network (PDN) gateway (P-GW) 12. Although not shown in FIG. 1, the core network 8 is typically also connected to an external network (e.g. The Internet) thereby providing the communication devices 3 access to the external network.

Each base station 5 is configured to send and receive signals in a sequence of radio frames 13 (each typically 10 ms in duration). Each radio frame 13 comprises a plurality of sub-frames 15 (typically 1 ms in duration), each of which comprises a pair of slots 17 (typically 0.5 ms in duration). Further details of the LTE frame structure will be given below with reference to FIGS. 2a and 2b.

The radio frames 13 carry control and user data signals between the base stations 5 and the communication devices 3. The base station 5 dynamically allocates resource blocks to the communication devices 3 in dependence of current transmission needs, device capabilities, system conditions and other static or dynamic parameters.

In order to provide coverage enhancement (e.g. for Rel-13 communication devices), when appropriate, the base stations 5 are configured to repeat downlink transmissions (of the same data) across multiple sub-frames 15 (and potentially across multiple radio frames 13). Similarly, when needed, the communication devices 3 are also configured to repeat their uplink transmissions for coverage enhancement purposes. The data that is transmitted repeatedly (in several successive sub-frames 15) can be combined at the receiving node (i.e. the receiving communication device 3 in case of downlink transmissions and the serving base station 5 in case of uplink transmissions), which is more likely to be able to decode the transmitted data successfully than based on a single copy of the information.

In the example shown in FIG. 1, the first communication device 3-1 located inside the coverage of the first cell 7-1 (e.g. when being served by the first base station 5-1) might experience strong inter-cell interference from the second cell 7-2 (e.g. from the second communication device 3-2 communicating with its own serving base station 5-2).

Therefore, in this system, the communication devices 3 and the base stations 5 are configured to apply a bit-level scrambling sequence for their transmissions so that the effects of such inter-cell interference are mitigated (or avoided altogether). However, rather than using a legacy scrambling sequence that is repeated in every radio frame 13, the communication devices 3 and the base stations 5 are configured to use a parameter in the initialisation of their own scrambling sequence, which parameter changes from radio frame to radio frame. Beneficially, using such a parameter allows the communication devices 3 and the base stations 5 communicating with each other to derive a scrambling sequence that is longer than one radio frame 13 and that is different to the scrambling sequence used in any neighbouring cell 7. Therefore, the issue of an interfering transmission from a neighbour cell 7 combining coherently (over the course of multiple radio frames 13) can be avoided (or mitigated), when the repetitions for coverage enhancement spread over multiple radio frames 13. Consequently, by using this new type of parameter for deriving a scrambling sequence, it is possible to achieve a better signal-to-interference-plus-noise ratio (SINR) than using legacy scrambling sequences.

In more detail, each communication device 3 and each associated serving base station 5 is configured to initialise, for each sub-frame 15, a scrambling sequence using the following formula:

$$c_{init} = n'_{RNTI} \cdot 2^{14} + q \cdot 2^{13} + \lfloor n_s/2 \rfloor \cdot 2^9 + N_{ID}^{cell} \quad \text{[Math. 4]}$$

where $c_{init}$ is an initial scrambling code for a sub-frame 15; $n'_{RNTI}$ is a parameter derived from a temporary identifier associated with a communication device 3 connected to a cell 7; q is a codeword index; $n_s$ is a slot number;

$$N_{ID}^{cell} \quad \text{[Math. 5]}$$

is a unique identifier of that particular cell 7 (a physical layer identity); and $$\lfloor x \rfloor \quad \text{[Math. 6]}$$

is a flooring function (i.e. the largest integer not greater than 'x').

In this example, the parameter $n'_{RNTI}$ is derived using the following formula:

$$n'_{RNTI} = (n_{RNTI} + SFN) \bmod 2^{16} \quad \text{[Math. 7]}$$

where $n_{RNTI}$ is the temporary identifier associated with the communication device 3 and SFN is a radio frame number (i.e. a 'system frame number').

Beneficially, since the parameter $n'_{RNTI}$ is dependent on the system frame number (SFN) associated with the current radio frame 13 (and hence it changes from one radio frame to another), the resulting $c_{init}$ for the same sub-frame 15 of a different radio frame 13 will also be different. Accordingly, the scrambling sequence in different radio frames 13 will also be different, which in turn reduces the risk of an interfering (repeated) transmission from a neighbour cell 7 combining coherently over multiple radio frames 13.

<LTE Sub-Frame Data Structure>

Before describing detailed how the present invention can be put into practice, a brief description will be given of the access scheme and a general frame structure agreed for LTE communications. An Orthogonal Frequency Division Multiple Access (OFDMA) technique is used for the downlink to allow the communication devices 3 to receive data over the air interface from their respective serving base station 5. For each communication device 3, respective sub-carriers are allocated by the serving base station 5 (for a predetermined amount of time) depending on the amount of data to be sent to that communication device 3. These blocks of sub-carriers are referred to as physical resource blocks (PRBs) in the LTE specifications. PRBs thus have a time and frequency dimension. The serving base station 5 dynamically allocates PRBs for each communication device 3 that it is serving and signals the allocations for each sub-frame (TTI) to each of the scheduled devices in a control channel.

FIG. 2a illustrates one generic frame structure agreed for LTE communications over the air interface with the base station 5. As shown, one radio frame 13 is 10 ms ('msec') long and comprises ten sub-frames 15 of 1 ms duration (known as a Transmission Time Interval (TTI)). Each sub-frame or TTI comprises two slots 17 of 0.5 ms duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17 (although this could clearly be different). The transmitted downlink signal comprises NBW subcarriers for a duration of Nsymb OFDM symbols. It can be represented by a resource grid as illustrated in FIG. 2b. Each box in the grid represents a single sub-carrier for one symbol period and is referred to as a resource element (RE). As shown, each PRB 21 is formed from twelve consecutive sub-carriers and (in this case) seven symbols for each subcarrier; although in practice the same allocations are made in the second slot 17 of each sub-frame 15 as well.

<Communication Device>

FIG. 3 is a block diagram illustrating the main components of one of the communication devices 3 shown in FIG. 1. The communication device 3 comprises a transceiver circuit 31 which is operable to transmit signals to, and to receive signals from, its serving base station 5 via at least one antenna 33. Although not necessarily shown in FIG. 3, the communication device 3 may of course have all the usual functionality of a conventional mobile telephone (such as a user interface 34) and/or an MTC device and such functionality may be provided by any one or any combination of hardware, software and firmware, as appropriate.

The operation of the transceiver circuit 31 is controlled by a controller 35 in accordance with software stored in memory 37. The software may be pre-installed in the memory 39 and/or may be downloaded via the telecommunications network or from a removable data storage device (RMD), for example. The software includes, among other things, an operating system 41, a communication control module 43, a scrambling module 45, and a coverage enhancement module 47.

The communication control module 43 manages communication with the base stations 5 serving the cell 7, in which the communication device 3 is located. The communication control module 43 manages communications between the serving base station 5 and the communication device 3 according to the schedule determined by the serving base station 5 (including any repetition of transmissions for coverage enhancement purposes).

The scrambling module 45 is responsible for scrambling data to be transmitted by the communication control module 43 to the serving base station 5 (and for de-scrambling data received by the communication control module 43 from the serving base station 5). When deriving (initialising) an appropriate scrambling sequence for a given sub-frame 15, the scrambling module 45 is configured to derive the scrambling sequence using a parameter that changes from radio frame to radio frame.

The coverage enhancement module 47 is responsible for repeating transmissions of the same data (via the communication control module 43) in accordance with the type (or degree) of coverage enhancement needed for the communication device 3. The coverage enhancement module 47 is also responsible for combining (after an appropriate de-scrambling by the scrambling module 45) multiple copies of the (same) data received from the serving base station 5 to derive the transmitted data.

<Base Station>

FIG. 4 is a block diagram illustrating the main components of one of the base stations 5 shown in FIG. 1. The base station 5 comprises a transceiver circuit 51 which is operable to transmit signals to, and to receive signals from, the communication devices 3 via at least one antenna 53. The at least one antenna 53 may be configured as an antenna array forming part of an active antenna system (AAS) for controlled transmission/reception of signals in a specific direction.

The base station 5 is also operable to transmit signals to and to receive signals from: the core network 8 via a network interface 54 (or 'S1' interface); and other base stations in the vicinity of the base station via a base station (or so called 'X2') interface 55.

The operation of the transceiver circuit 51 is controlled by a controller 57 in accordance with software stored in memory 59. The software includes, among other things, an operating system 61, a communication control module 63, a scrambling module 65, and a coverage enhancement module 67.

The communication control module 63 is operable to control communication with the communication devices 3 served by the base station 5 and to control communication with the core network 6 and other base stations via the transceiver circuit 51. The communication control module 63 manages communications between the base station 5 and connected communication devices 3 according to a schedule determined by the communication control module 63 (including any repetition of transmissions for coverage enhancement purposes, determined based on information provided by the coverage enhancement module 67).

The scrambling module 65 is responsible for scrambling data to be transmitted by the communication control module 63 to connected communication devices 3 (and for de-scrambling data received by the communication control module 63 from connected communication devices 3). When deriving (initialising) an appropriate scrambling sequence for a given sub-frame 15, the scrambling module 65 is configured to derive the scrambling sequence using a parameter that changes from radio frame to radio frame.

The coverage enhancement module 67 is responsible for repeating transmissions of the same data (via the communication control module 63) in accordance with the type (or degree) of coverage enhancement needed for the communication device 3 for which the transmission is intended. The coverage enhancement module 67 is also responsible for combining (after an appropriate de-scrambling by the scrambling module 65) multiple copies of the (same) data received from the communication devices 3 to derive the transmitted data.

In the above description, the communication devices and the base stations are described for ease of understanding as having a number of discrete modules (such as the scrambling modules and the coverage enhancement modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

A more detailed description of some of the novel aspects of the operation of the base stations 5 and of the communication devices 3 will now be given, with reference to FIGS. 5 and 6.

<Simulation>

FIG. 5 is a comparison of simulation results for various scrambling techniques that may be used in the system 1 shown in FIG. 1. Specifically. FIG. 5 illustrates the performance difference between legacy (Rel-8) scrambling sequences and corresponding (extended/long) scrambling sequences according to exemplary embodiments of the present invention.

The simulation assumptions are set in accordance with those specified in 3GPP R1-144513 for reference cases in MTC link-level performance evaluation. In more detail, the following two scenarios have been considered, both with the same average signal-to-interference-plus-noise ratio (SINR) of −3.0 dB but with different signal-to-interference ratios (SIRs) and interference-to-noise ratios (INRs):

1. noise dominated scenario: SNR=−2.96 dB; INR=−20 dB; SINR=−3.0 dB
2. interference dominated scenario: SNR=1.76 dB; INR=3.0 dB; SINR=−3.0 dB For both the noise dominated scenario and the interference dominated scenario, the legacy scrambling sequence and the above described extended/long scrambling sequence have been evaluated. Moreover, the simulations were repeated with and without frequency hopping.

In FIG. 5, the corresponding simulation results were divided into two groups: one group in which no frequency hopping was applied (simulation cases a to d); and another group in which frequency hopping, using 4 narrowbands was applied (simulation cases e to h).

In both group, a distinction is made between interference dominated and noise dominated scenarios, and between applying the legacy scrambling sequence or the novel (extended/long) scrambling sequence.

Accordingly, the group without frequency hopping includes four simulation cases:
  a) interference dominated (legacy);
  b) interference dominated (long scrambling sequence);
  c) noise dominated (legacy); and
  d) noise dominated (long scrambling sequence).

Additionally, the group with frequency hopping also includes four simulation cases:
  e) interference dominated (legacy);
  f) interference dominated (long scrambling sequence);
  g) noise dominated (legacy); and
  h) noise dominated (long scrambling sequence).

The performance of PDSCH transmissions with repetitions longer than ten sub-frames have been evaluated in link level simulation in the presence of inter-cell interference. In this case, the inter-cell interference is modelled in such a way that two communication devices 3 have transmissions at the same time in the same frequency bandwidth but each communication device 3 (i.e. with a different C-RNTI) is attached to a different cell 7 (i.e. with different Cell ID). One of the communication devices 3 is taken to be the desired signal and the other communication device 3 is assumed to be the interfering signal. Further details of the applied link level simulation assumptions are captured in Table 1 below.

When no frequency hopping is applied, in the noise dominated scenarios (i.e. cases c and d in FIG. 5), the difference in terms of an associated block error rate (BLER) between the performance of the legacy scrambling and the performance of the novel long scrambling is relatively small. However, in the interference dominated scenarios (cases a and b), the difference between the legacy scrambling sequence and the novel long scrambling sequence in terms of BLER performance is relatively large.

When frequency hopping is applied, in noise dominated scenarios (cases g and h), the difference in terms of BLER between the performance of the legacy scrambling and the performance of the novel long scrambling is relatively small. However, in the interference dominated scenarios (cases e and f), the difference between the legacy scrambling sequence and the novel long scrambling sequence in terms of BLER performance is relatively large.

Accordingly, there is a clear benefit that can be attributed to the above described extended scrambling sequence for long repetitions/coverage enhancement (at least in some cases). In other words, in the interference dominated case, the extended scrambling sequence has a significantly better performance for long repetitions (over multiple radio frames) than the legacy scrambling sequence regardless whether frequency hopping is applied or not (whilst the performance in noise dominated cases is also not adversely effected).

<Operation>

FIG. 6 is an exemplary flowchart showing the initiation of a scrambling sequence employed by the base stations 5 and of the communication devices 3 shown in FIG. 1. Specifically, FIG. 6 illustrates the procedure performed by the respective scrambling modules 45 and 65 of a communication device 3 and its serving base station 5 communicating with each other. This procedure is performed for every sub-frame 15 and for every cell 7 in which the communication device 3 and its serving base station 5 are communicating data for each other.

Optionally, the procedure may start by performing a check (in step S01) whether or not the communication device 3 requires applying a legacy scrambling sequence (e.g. due to compatibility with only the Rel-8 scrambling technique). It will be appreciated that this check may be performed, for example, when the communication device 3 first connects to the base station 5, as part of an initial registration process (which typically involves exchanging compatibility information). Accordingly, in this case it is not necessary to perform/repeat this check during the procedure shown in FIG. 6.

If the communication device 3 and its serving base station 5 can establish that a legacy scrambling is not required (S01: 'NO'), then they proceed to step S02.

In step S02, the scrambling module 45/65 is configured to determine the parameter $n'_{RNTI}$ using the formula $n'_{RNTI} = (n_{RNTI} + SFN) \bmod 2^{16}$ (where $n_{RNTI}$ is the temporary identifier assigned to the communication device 3 by the serving base station 5; and SFN is a radio frame number for the current radio frame 13).

Next, in step S03, the scrambling module 45/65 is configured to determine the scrambling code ($c_{init}$) for the current sub-frame 15, using the following formula:

$$c_{init} = n'_{RNTI} \cdot 2^{14} + q \cdot 2^{13} + \lfloor n_s/2 \rfloor \cdot 2^9 + N_{ID}^{cell}. \quad \text{[Math. 8]}$$

Finally, as generally shown in step S04, the scrambling module 45/65 is configured to apply the scrambling code $c_{init}$ for its communications (with the corresponding base station/communication device) in the current sub-frame 15.

Specifically, in cell 7-1 shown in FIG. 1, the scrambling module 65 of the base station 5-1 uses, in the current sub-frame 15, the scrambling code $c_{init}$ (derived in step S04) for scrambling its downlink communications to the first communication device 3-1 (and uses this scrambling code $c_{init}$ for de-scrambling any uplink communications from the first communication device 3-1 in the current sub-frame 15).

Similarly, the scrambling module 45 of the first communication device 3-1 applies, in the same sub-frame 15, the same scrambling code $c_{init}$ for its communications with the base station 5-1 (scrambling uplink transmissions and de-scrambling downlink transmissions).

At the end of the current sub-frame, the procedure ends (but starts again for the next sub-frame, using the parameters specific to that sub-frame).

Since each cell has a respective different associated cell identifier and each base station assigns different temporary identifiers to different communication devices, the procedure shown in FIG. 6 will always yield a different $c_{init}$ value for each different combination of cell and communication device. Moreover, since the formula for deriving the value of $c_{init}$ includes the parameter $n'_{RNTI}$, the procedure also yields a different $c_{init}$ value for different radio frames (for the same combination of cell and communication device). Beneficially, the risk of interfering transmissions from a neighbour cell combining coherently over multiple radio frames (when such transmissions are repeated for coverage enhancement) can be reduced.

<Modifications and Alternatives>

Detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

It will be appreciated that $n'_{RNTI}$ may also be derived (in step S02) using the formula:

$$n'_{RNTI} = (n_{RNTI} + k) \bmod 2^{16}$$

where k is a sub-frame counter incremented with every repetition (i.e. with every re-transmission of the same data). It will be appreciated that the sub-frame counter k may be reset to an appropriate start value (e.g. the value '0' or '1') on each new transmission. Alternatively, the sub-frame counter k may be configured to increase even when initially transmitting new data. In this case, the sub-frame counter k may be configured to 'wrap around' (or reset to '0') once it has reached its maximum value (e.g. determined by the number of bits used for the sub-frame counter k).

Alternatively, the communication device and its serving base station may be configured to derive, for each sub-frame, a scrambling sequence using the following modified formula:

$$c_{init}=2^{30}+n'_{RNTI}\cdot 2^{14}+q\cdot 2^{13}+\lfloor n_s/2\rfloor\cdot 2^9+N_{ID}^{cell} \quad \text{[Math. 9]}$$

where $c_{init}$ is an initial scrambling code for a sub-frame; $n'_{RNTI}$ is a parameter derived from a temporary identifier associated with a communication device connected to a cell; q is a codeword index; $n_s$ is a slot number;

$$N_{ID}^{cell} \quad \text{[Math. 10]}$$

is a unique identifier of that particular cell (a physical layer identity); and $$\lfloor x \rfloor \quad \text{[Math. 11]}$$

is a flooring function (i.e. the largest integer not greater than 'x').

Advantageously, bit #30 of this modified formula is set to 1 (by including the value $2^{30}$), so that even if the $n'_{RNTI}$ for a particular communication device in a cell (employing coverage enhancement) happens to match the $n_{RNTI}$ for another communication device in that cell (e.g. a legacy communication device employing a legacy scrambling sequence and not configured to derive an associated $n'_{RNTI}$), these communication devices will still apply different scrambling sequences.

In the above description of FIG. 1, the communication devices are described as to employ coverage enhancement techniques (repetition combining) typically used by MTC devices. However, it will be appreciated that the above described scrambling sequences are applicable to any type of user equipment and they are not limited to MTC devices. It will also be appreciated that the above described scrambling sequences may be applied to transmissions regardless whether or not any coverage enhancement is used (and/or regardless of the number/duration of repetitions).

In the example mobile telecommunication system of FIG. 1, the geographical coverage of the first cell 7-1 is shown to overlap partially with the geographical coverage of the second cell 7-2. However, other arrangements are also possible. For example, the first cell 7-1 might be completely outside the area of the second cell 7-2 (whilst communication devices within either cell may still cause interference to transmissions in the other cell). It will also be appreciated that some cells (e.g. pico cells) might fall completely within the geographical coverage of another cell (e.g. a macro cell). In some cases, the same base station might operate any number of (macro and/or pico) cells simultaneously. In yet another exemplary embodiment, the cells 7-1 and 7-2 form part of two separate telecommunication networks.

In the above exemplary embodiments, a mobile telephone based telecommunications system was described. As those skilled in the art will appreciate, the signaling techniques described in the present application can be employed in other communications system. Other communications nodes or devices may include user devices such as, for example, personal digital assistants, laptop computers, booklet computers, wireless routers, web browsers, etc. As those skilled in the art will appreciate, it is not essential that the above described system be used for mobile communications devices. The system can be used to improve a network having one or more fixed communication devices as well as or instead of the mobile communicating devices.

In the above exemplary embodiments, a number of software modules were described. As those skilled in the art will appreciate, the software modules may be provided in compiled or un-compiled form and may be supplied to the node as a signal over a computer network, or on a recording medium. Further, the functionality performed by part or all of this software may be performed using one or more dedicated hardware circuits. However, the use of software modules is preferred as it facilitates the updating of the node in order to update its functionality. Similarly, although the above exemplary embodiments employed transceiver circuitry, at least some of the functionality of the transceiver circuitry can be performed by software.

The parameter may be derived based on at least one of: a system frame number associated with at least one of said sequence of sub-frames; and a counter.

For example, parameter may be derived using the following formula:

$$n'_{RNTI}=(n_{RNTI}+k)\bmod 2^{16}$$

where $n'_{RNTI}$ is the parameter; $n_{RNTI}$ is a temporary identifier associated with a mobile device connected to said cell and for which said scrambling code is applicable; and SFN is a system frame number associated with said at least one of said sequence of sub-frames.

Alternatively, the parameter may be derived using the following formula:

$$n'_{RNTI}=(n_{RNTI}+k)\bmod 2^{16}$$

where $n'_{RNTI}$ is the parameter; $n_{RNTI}$ is a temporary identifier associated with a mobile device connected to said cell and for which said scrambling code is applicable; and k is a sub-frame counter.

The parameter may be derived by incrementing the sub-frame counter upon each repetition of a particular signal. The sub-frame counter may be reset to a default value (e.g. '0') when at least one of the following occurs: said particular signal is being communicated for the first time; and said sub-frame counter reaches an associated maximum value.

The scrambling code may be derived using at least one of the following formulas:

$$c_{init}=n'_{RNTI}\cdot 2^{14}+q\cdot 2^{13}+\lfloor n_s/2\rfloor\cdot 2^9+N_{ID}^{cell} \quad \text{[Math. 12]}$$

and $$c_{init}=2^{30}+n'_{RNTI}\cdot 2^{14}+q\cdot 2^{13}+\lfloor n_s/2\rfloor\cdot 2^9+N_{ID}^{cell} \quad \text{[Math. 13]}$$

where $c_{init}$ is the scrambling code; $n'_{RNTI}$ is the parameter; q is a codeword index; $n_s$ is a slot number associated with said sequence of sub-frames:

$$N_{ID}^{cell} \quad \text{[Math. 14]}$$

is a unique identifier for said cell; and $$\lfloor x \rfloor \quad \text{[Math. 15]}$$

is a flooring function (i.e. the largest integer not greater than 'x').

The scrambling means may be configured to: scramble said signals using said scrambling code upon transmission by said communicating means; and/or de-scramble said signals using said scrambling code upon reception by said communicating means.

The communication apparatus may comprise at least one of: a base station; a mobile (cellular) telephone; and a machine-type communication (MTC) device.

Various other modifications will be apparent to those skilled in the art and will not be described in further detail here.

The following is a detailed description of the way in which the present inventions may be implemented in the currently proposed 3GPP standards. Whilst various features are described as being essential or necessary, this may only be the case for the proposed 3GPP standard, for example due to other requirements imposed by the standard. These statements should not, therefore, be construed as limiting the present invention in any way.

3GPP TSG RAN WG1 Meeting #83
R1-156683
Source: NEC
Title: Extending the Scrambling Sequence for DL/UL Transmissions
Agenda Item: 6.2.1.4
Document for: Discussion and Decision

1 INTRODUCTION

Currently a bit-level scrambling code/sequence is applied for all DL and UL transmissions such as PBCH, PDSCH, PDCCH, PCFICH, PHICH and PUSCH, in order to randomise the interference between the neighbouring cells. The scrambling sequence has a period of 10 subframes (i.e. one radio frame). In the case of PUSCH and PDSCH, the scrambling sequence generator is initialized in each subframe as follows:

$$c_{init} = n_{RNTI} \cdot 2^{14} + q \cdot 2^{13} + \lfloor n_s/2 \rfloor \cdot 2^9 + N_{ID}^{cell} \quad [\text{Math. 16}]$$

In [4], it is stated that the period of scrambling sequence is 10 subframes and then repeats itself. In the case of long repetition combining over more than one radio frame, if the inter-cell interference is also using long repetition then the interference will combine coherently between radio frames and consequently the SINR gain of repetition combining will be reduced.

In this contribution, we investigate the performance difference of Rel-8 and extended scrambling sequences for long repetitions for Rel-13 MTC.

2 EXTENDED SCRAMBLING SEQUENCE

In order to randomize the interference during long repetition combining, we applied the following modified scrambling sequence initialization in the case of long repetition transmissions:

$$c_{init} = 2^{30} + n'_{RNTI} \cdot 2^4 + q \cdot 2^{13} + \lfloor n_s/2 \rfloor \cdot 2^9 + N_{ID}^{cell}$$

$$n'_{RNTI} = (n_{RNTI} + SFN) \mod 2^{16}. \quad [\text{Math. 17}]$$

The differences compared to the legacy scrambling sequence initialization are:
1. $n_{RNTI}$ is replaced by $n'_{RNTI}$ which changes every radio frame based on SFN
2. Bit 30 is set to 1, so that even if $n'_{RNTI}$ of a long-repetition UE happens to match with $n_{RNTI}$ of a legacy UE, these UEs will still apply different scrambling sequence.

3 PERFORMANCE EVALUATIONS

We have evaluated the performance of PDSCH with repetitions longer than 10 subframes in link level simulation taking into account the inter-cell interference. The inter-cell interference is modelled in such a way that two users have transmissions at the same time in the same frequency bandwidth but each user (i.e. with a different C-RNTI) is attached to a different cell (i.e. with different Cell ID). One of the users is taken to be the desired signal and the other one is assumed to be the interfering signal. The link level simulation assumptions are based on [3] and are captured in Table 1 in the Appendix section.

We simulated two scenarios, both with average SINR of −3 dB:
1. Noise dominated: SNR=−2.96 dB, INR=−20 dB, SINR=−3.0 dB
2. Interference dominated: SNR=1.76 dB, INR=3.0 dB, SINR=−3.0 dB In each scenario, we tried both the legacy scrambling sequence and the extended/long scrambling sequence described above.

FIG. 5 shows the link level simulation results with and without narrowband frequency hopping.

In case of no frequency hopping and noise dominated, it can be seen that with Rel-8 scrambling and with long scrambling, the difference in terms of BLER performance is very small. However, it can be observed that in case of interference dominated, the difference between Rel-8 and long scrambling in terms of BLER performance is very large.

In case of four narrowbands with frequency hopping and noise dominated, it can be seen that with Rel-8 scrambling and with long scrambling, the difference in terms of BLER performance is very small. However, it can be observed that in case of interference dominated, the difference between Rel-8 and long scrambling in terms of BLER performance is very large, hence, showing the benefit of having extended scrambling sequence for long repetitions.

It can be summarized that in case of interference dominated, the extended scrambling sequence for long repetitions has a better performance than Rel-8 scrambling sequence regardless whether frequency hopping is applied or not.

Observation:

In case of interference dominated, the extended scrambling sequence for long repetitions has significant performance over Rel-8 scrambling sequence.

4 CONCLUSION

In this contribution, we have investigated the performance difference of Rel-8 and extended scrambling sequences for long repetitions for Rel-13 MTC. We have the following observations and proposals:

Observation:

In case of interference dominated, the extended scrambling sequence for long repetitions has significant performance over Rel-8 scrambling sequence.

Proposal 1:

Adapt extended scrambling sequence for long repetitions as follows:

$$c_{init} = 2^{30} + n'_{RNTI} \cdot 2^{14} + q \cdot 2^{13} + \lfloor n_s/2 \rfloor \cdot 2^9 + N_{ID}^{cell} \quad [\text{Math. 18}]$$

where $n'_{RNTI} = (n_{RNTI} + SFN) \mod 2^{16}$.

5 REFERENCES

[1] 3GPP TR 36.888 V 12.0.0, "Study on provision of low-cost MTC UEs based on LTE (Release-12)".
[2] 3GPP RP-150492, "Revised WI: Further LTE Physical Layer Enhancements for MTC", Ericsson, RAN#67
[3] 3GPP R1-144513, "Simulation Assumptions for Reference Cases for MTC", Nokia Networks, RAN1#78bis
[4] 3GPP R1-154460, "Discussion on open issues in MTC PDSCH", Spreadtrum Communications

6 APPENDIX—SIMULATION ASSUMPTIONS

TABLE 1

Link level Simulation Assumption
(in accordance with R1-144513)

| Parameter | Value |
|---|---|
| Number of subframes | 50000 |
| System bandwidth | 5 MHz |
| Frame structure | FDD |
| Carrier frequency | 2.0 GHz for FDD |
| Antenna configuration | 2 × 1 |
| Channel model | EPA |
| Doppler spread | 1 Hz |
| Transport block size (TBS) | 328 bits |
| Number of PRBs | 6 |
| Redundancy versions (RV) | RV0 |
| Transmission Mode | TM2 |
| Frequency error | Not modelled |
| Performance target/Requirement | 1% BLER for SIB and 10% BLER for Unicast PDSCH |
| Channel estimation | Practical (single subframe channel estimation) |
| Inter-cell interference modelling | Two cells where each cell has one user. Each user (i.e. with a different C-RNTI) is attached to a different cell (i.e. with different Cell ID) |

The whole or part of the exemplary embodiments disclosed above can be described as, but not limited to, the following supplementary notes.

(Supplementary note 1) Communication apparatus for a cellular communication system comprising a plurality of cells, the communication apparatus comprising:

means for communicating signals in a cell in a sequence of radio frames:

means for scrambling said signals communicated in said cell using a scrambling code; and wherein said scrambling code is derived based on a parameter that changes from radio frame to radio frame.

(Supplementary note 2) The communication apparatus according to Supplementary note 1, wherein said parameter is derived based on at least one of: a system frame number associated with at least one of said sequence of sub-frames; and a counter.

(Supplementary note 3) The communication apparatus according to Supplementary note 1 or 2, wherein said parameter is derived using the following formula:

$$n'_{RNTI} = (n_{RNTI} + SFN) \bmod 2^{16}$$

where $n'_{RNTI}$ is said parameter; $n_{RNTI}$ is a temporary identifier associated with a mobile device connected to said cell and for which said scrambling code is applicable; and SFN is a system frame number associated with said at least one of said sequence of sub-frames.

(Supplementary note 4) The communication apparatus according to Supplementary note 1 or 2, wherein said parameter is derived using the following formula:

$$n'_{RNTI} = (n_{RNTI} + k) \bmod 2^{16}$$

where $n'_{RNTI}$ is said parameter; $n_{RNTI}$ is a temporary identifier associated with a mobile device connected to said cell and for which said scrambling code is applicable; and k is a sub-frame counter.

(Supplementary note 5) The communication apparatus according to Supplementary note 4, wherein said parameter is derived by incrementing said sub-frame counter upon each repetition of a particular signal.

(Supplementary note 6) The communication apparatus according to Supplementary note 4 or 5, wherein said sub-frame counter is reset to a default value (e.g. '0') when at least one of the following occurs: said particular signal is being communicated for the first time; and said sub-frame counter reaches an associated maximum value.

(Supplementary note 7) The communication apparatus according to any of Supplementary notes 1 to 6, wherein said scrambling code is derived using at least one of the following formulas:

$$c_{init} = n'_{RNTI} \cdot 2^{14} + q \cdot 2^{13} + \lfloor n_s/2 \rfloor \cdot 2^9 + N_{ID}^{cell} \quad \text{[Math. 19]}$$

and $$c_{init} = 2^{30} + n'_{RNTI} \cdot 2^{14} + q \cdot 2^{13} + \lfloor n_s/2 \rfloor \cdot 2^9 + N_{ID}^{cell} \quad \text{[Math. 20]}$$

where $c_{init}$ is the scrambling code; $n'_{RNTI}$ is the parameter; q is a codeword index; $n_s$ is a slot number associated with said sequence of sub-frames;

$$N_{ID}^{cell} \quad \text{[Math. 21]}$$

is a unique identifier for said cell; and $$\lfloor x \rfloor \quad \text{[Math. 22]}$$

is a flooring function (i.e. the largest integer not greater than 'x').

(Supplementary note 8) The communication apparatus according to any of Supplementary notes 1 to 7, wherein said scrambling means is configured to: scramble said signals using said scrambling code upon transmission by said communicating means; and/or de-scramble said signals using said scrambling code upon reception by said communicating means.

(Supplementary note 9) The communication apparatus according to any of Supplementary notes 1 to 8, comprising at least one of: a base station; a mobile (cellular) telephone; and a machine-type communication (MTC) device.

(Supplementary note 10) A system comprising the communication apparatus according to any of Supplementary notes 1 to 9, the communication apparatus forming part of at least one of a base station and a mobile communication device.

(Supplementary note 11) A method performed by communication apparatus configured to communicate signals, in a sequence of radio frames, in a cell of cellular communication system comprising a plurality of cells, the method comprising:

deriving a scrambling code based on a parameter that changes from radio frame to radio frame; and scrambling signals communicated in a cell using a scrambling code.

(Supplementary note 12) A computer program product comprising instructions for causing a computer-programmable device to perform the method according to Supplementary note 11.

This application is based upon and claims the benefit of priority from United Kingdom patent application No. 1519656.1, filed on Nov. 6, 2015, the disclosure of which is incorporated herein in its entirety by reference.

The invention claimed is:

1. A communication apparatus for a communication system comprising a plurality of cells, and comprising:
   a memory configured to store instructions; and
   one or more processors configured to execute the instructions to:
   control a transceiver to communicate signals between the communication apparatus and a user equipment; and
   scramble the signals communicated for the user equipment, using a scrambling sequence,
   wherein:
   i) when the user equipment does not require coverage enhancement, the scrambling sequence is initialized, in each sub-frame, using the formula for a Physical Downlink Shared Channel (PDSCH):

$c_{init}=n_{RNTI} \cdot 2^{14}+q \cdot 2^{13}+\lfloor n_s/2 \rfloor \cdot 2^9+N_{ID}^{cell}$, where $c_{init}$ is an initial scrambling code for a sub-frame, $n_{RNTI}$ is a temporary identifier associated with the user equipment, q is a codeword index, $n_s$ is a slot number, and $N_{ID}^{cell}$ is a cell identifier; and
   ii) when the user equipment is configured as a bandwidth limited user equipment that requires coverage enhancement, the scrambling sequence is applied per sub-frame for the PDSCH for a given block of sub-frames, wherein the block of sub-frames comprises ten sub-frames, and said scrambling sequence is initialized based on a parameter that changes from one block of sub-frames to a next block of sub-frames.

2. The communication apparatus according to claim 1, wherein the parameter is derived based on at least one of: a system frame number associated with at least one of the sequence of sub-frames; and a counter associated with the time block of sub-frames.

3. The communication apparatus according to claim 1, wherein the parameter is derived using the following equation:

$n'_{RNTI}=(n_{RNTI}+SFN) \mod 2^{16}$ where $n'_{RNTI}$ is the parameter, $n_{RNTI}$ is a temporary identifier associated with a mobile device connected to the cell and for which the scrambling sequence is applicable, and SFN is a system frame number associated with the at least one of the sequence of sub-frames.

4. The communication apparatus according to claim 1, wherein the parameter is derived using the following equation:

$n'_{RNTI}=(n_{RNTI}+k) \mod 2^{16}$ where $n'_{RNTI}$ is the parameter; $n_{RNTI}$ is a temporary identifier associated with a mobile device connected to the cell and for which the scrambling sequence is applicable; and k is a sub-frame counter.

5. The communication apparatus according to claim 4, wherein the parameter is derived by incrementing the sub-frame counter upon each repetition of a particular signal.

6. The communication apparatus according to claim 4, wherein the sub-frame counter is reset to a default value (e.g. '0') if at least one of the following occurs: the particular signal is being communicated for the first time; and the sub-frame counter reaches an associated maximum value.

7. The communication apparatus according to claim 1, wherein the scrambling sequence is derived using at least one of the following equations:

$c_{init}=n'_{RNTI} \cdot 2^{14}+q \cdot 2^{13}+\lfloor n_s/2 \rfloor \cdot 2^9+N_{ID}^{cell}$ and $c_{init}=2^{30}+n'_{RNTI} \cdot 2^{14}+q \cdot 2^{13}+\lfloor n_s/2 \rfloor \cdot 2^9+N_{ID}^{cell}$ where $e_{init}$ $n'_{RNTI}$ is the parameter, and $n_s$ is a slot number associated with the sequence of sub-frames, $N_{ID}^{cell}$ and $\lfloor x \rfloor$ is a flooring function (i.e. the largest integer not greater than 'x').

8. The communication apparatus according to claim 1, wherein the one or more processors is/are further configured to apply the scrambling sequence to the signals for descrambling the signals upon reception by the transceiver.

9. The communication apparatus according to claim 1, wherein each time block comprises ten sub-frames.

10. The communication apparatus according to claim 1, comprising a base station.

11. A system comprising the communication apparatus according to claim 1, the communication apparatus forming part of a base station.

12. A method performed by a communication apparatus for a communication system comprising a plurality of cells, the method comprising:
    communicating signals between the communication apparatus and a user equipment; and
    scrambling the signals communicated for the user equipment, using a scrambling sequence,
    wherein:
    i) when the user equipment does not require coverage enhancement, the scrambling sequence is initialized, in each sub-frame, using the formula for a Physical Downlink Shared Channel (PDSCH):

$c_{init}=n_{RNTI} \cdot 2^{14}+q \cdot 2^{13}+\lfloor n_s/2 \rfloor \cdot 2^9+N_{ID}^{cell}$, where $c_{init}$ is an initial scrambling code for a sub-frame, $n_{RNTI}$ is a temporary identifier associated with the user equipment, q is a codeword index, $n_s$ is a slot number, and $N_{ID}^{cell}$ is a cell identifier; and
    ii) when the user equipment is configured as a bandwidth limited user equipment that requires coverage enhancement, the scrambling sequence is applied per sub-frame for the PDSCH for a given block of sub-frames, wherein the block of sub-frames comprises ten sub-frames, and said scrambling sequence is initialized based on a parameter that changes from one block of sub-frames to a next block of sub-frames.

13. A non-transitory medium storing a program comprising instructions for causing a computer-programmable device of a communication apparatus for a communication system comprising a plurality of cells, the communication apparatus being configured to communicate signals between the communication apparatus and a user equipment, to perform a method comprising:
    scrambling the signals communicated for the user equipment, using a scrambling sequence,
    wherein:
    i) when the user equipment does not require coverage enhancement, the scrambling sequence is initialized, in each sub-frame, using the formula for a Physical Downlink Shared Channel (PDSCH):

$c_{init}=n_{RNTI} \cdot 2^{14}+q \cdot 2^{13}+\lfloor n_s/2 \rfloor \cdot 2^9+N_{ID}^{cell}$, where $c_{init}$ is an initial scrambling code for a sub-frame, $n_{RNTI}$ is a temporary identifier associated with the user equipment, q is a codeword index, $n_s$ is a slot number, and $N_{ID}^{cell}$ is a cell identifier, and ii) when the user equipment is configured as a bandwidth limited user equipment that requires coverage enhancement, the scrambling sequence is applied per sub-frame for the PDSCH for a given block of sub-frames, wherein the block of sub-frames comprises ten sub-frames, and said scrambling sequence is initialized based on a parameter that changes from one block of sub-frames to a next block of sub-frames.

14. The non-transitory medium according to claim 13, wherein the method further comprises deriving the parameter based on at least one of: a system frame number associated with at least one of the sequence of sub-frames; and a counter associated with the block of sub-frames.

15. The method according to claim 12, comprising deriving the parameter based on at least one of: a system frame number associated with at least one of the sequence of sub-frames; and a counter associated with the block of sub-frames.

* * * * *